(12) United States Patent
Lee et al.

(10) Patent No.: US 11,167,749 B2
(45) Date of Patent: Nov. 9, 2021

(54) HYBRID ELECTRIC POWERTRAIN WITH ENGINE TORQUE-SMOOTHING TRANSITION CONTROL LOGIC

(71) Applicant: GM GLOBAL TECHNOLOGY OPERATIONS LLC, Detroit, MI (US)

(72) Inventors: Chunhao J. Lee, Troy, MI (US);
Neeraj S. Shidore, Novi, MI (US);
Norman K. Bucknor, Troy, MI (US);
Dongxu Li, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 16/747,281

(22) Filed: Jan. 20, 2020

(65) Prior Publication Data
US 2021/0221353 A1 Jul. 22, 2021

(51) Int. Cl.
*B60W 20/40* (2016.01)
*B60W 20/30* (2016.01)
*B60W 30/19* (2012.01)
*B60W 10/02* (2006.01)
*B60K 6/383* (2007.10)

(52) U.S. Cl.
CPC ............ *B60W 20/40* (2013.01); *B60K 6/383* (2013.01); *B60W 10/024* (2020.02); *B60W 20/30* (2013.01); *B60W 30/19* (2013.01); *B60W 2510/06* (2013.01)

(58) Field of Classification Search
CPC .... B60W 20/40; B60W 10/024; B60W 20/30; B60W 30/19; B60W 2510/06
See application file for complete search history.

(56) References Cited

U.S. PATENT DOCUMENTS

| 8,649,925 | B2* | 2/2014 | Light | B60W 10/30 701/22 |
| 2011/0166727 | A1* | 7/2011 | Light | F16H 57/0441 701/22 |
| 2013/0023379 | A1* | 1/2013 | Bucknor | B60W 10/023 477/5 |

* cited by examiner

*Primary Examiner* — Tinh Dang
(74) *Attorney, Agent, or Firm* — Quinn IP Law

(57) ABSTRACT

A hybrid electric powertrain for a vehicle includes an engine, electric machine, torque converter having a pump, turbine, and torque converter clutch ("TCC") configured, when applied, to lock the pump to the turbine, a one-way engine disconnect clutch connected to the turbine, a transmission, and a controller. A transmission input shaft directly couples to the electric machine, and is selectively coupled to the engine via the disconnect clutch. An output shaft is connectable to road wheels of the vehicle. The controller, in response to an engine-off request, determines turbine and pump speeds of the turbine and pump, respectively, registers that the engine is in an engine-off state when the pump speed is less than the turbine speed, and executes an electric vehicle ("EV") mode shift using machine torque from the electric machine when the pump speed is zero during the engine-off state.

20 Claims, 3 Drawing Sheets

| S (10) | S (14) | S (28)* | $N_E$ | DISC. | R | S (28) = |
|---|---|---|---|---|---|---|
| EV | - | 0 | 0 | 1 | 0 | 1 |
| (14) TIP | + | 0 | < $N_T$ | 0 | 0 | 1 |
| HEV, 28 = 0 | + | 0 | > $N_T$ | 0 | 1 | 0 |
| HEV, 28 = L | + | X | = $N_T$ | 0 | 0 | 0 |
| → (14) OFF | - | X | = $N_T$ | 1 | 0 | 1 |
| (14) = OFF/REG | - | 0 | < $N_T$ | 1 | 0 | 1 |
| Δ1 | + | 0 | < $N_T$ | 0 | 0 | 1 |
| Δ2 | + | 0 | > $N_T$ | 0 | 1 | 0 |
| (10) = 0RPM | - | 0 | ∅ | 1 | 0 | 1 |

HYBRID ELECTRIC POWERTRAIN WITH ENGINE TORQUE-SMOOTHING TRANSITION CONTROL LOGIC

INTRODUCTION

The present disclosure relates to the control of a hybrid electric powertrain having multiple torque sources in the form of an internal combustion engine and one or more rotary electric machines. In a motor vehicle application, the generated engine torque may be transferred to a set of road wheels via a multi-speed automatic transmission and a final drive unit. The ability of a hybrid operating system or controller to supplement or replace available engine torque with machine torque from the rotary electric machine(s) reduces consumption of fossil fuel and thereby improves overall fuel economy relative to powertrains using the engine as the sole prime mover.

Powertrains having an automatic transmission employ a hydrokinetic torque converter between the engine and the transmission. As will be appreciated by those of ordinary skill in the art, a torque converter includes a stator disposed between an engine-connected impeller or pump and a turbine connected to the transmission's input shaft. A large differential in rotational speed of the pump and turbine results in torque multiplication, for example when accelerating from a standstill with the engine running.

A P2 hybrid electric powertrain is one in which the engine and an electric machine are connected to the transmission input shaft in parallel torque paths. In a typical P2 powertrain having the above-noted torque converter, the engine may be connected to or disconnected from the transmission input shaft via a dedicated engine disconnect clutch while the electric machine remains connected to the transmission input shaft. Such a configuration allows the transmission to be powered solely by the electric machine in certain operating modes. When the powertrain is used aboard a motor vehicle, such an operating mode is referred to in the art as an electric vehicle ("EV") mode. Because the engine is shut off in EV modes, as well as during engine auto-stop events when the vehicle comes to a standstill, the hybrid controller must account for the available torque from the engine and the electric machine. Interposition of the torque converter in the P2 powertrain complicates torque blending operations. Suboptimal methods for performing EV shifts, or connecting or disconnecting the engine from the transmission input member during mode transitions, may lead to undesirable driveline torque disturbances.

SUMMARY

Methodologies and associated power architectures are described herein for improving mode transitions and EV shifts in a hybrid electric powertrain having a P2 configuration. As described generally above, a P2 powertrain includes an internal combustion engine, a hydrokinetic torque converter, an engine disconnect clutch, a rotary electric machine, and an automatic transmission.

The torque converter includes a stator, a pump, a turbine, and a torque converter clutch ("TCC"). The TCC is selectively applied under certain conditions to securely lock the pump to the turbine, thereby eliminating slip across the torque converter. When the TCC is open, a pump-turbine speed differential may exist across the torque converter to enable torque multiplication, as will be appreciated by those of ordinary skill in the art.

As part of the disclosed powertrain, a passive one-way clutch is used as the engine disconnect clutch on the turbine side of the torque converter. When the engine disconnect clutch is open, the engine is completely disconnected from the transmission's input shaft regardless of the state of the TCC. The engine disconnect clutch in some embodiments is an integral component of the torque converter, a configuration which requires execution of the disclosed logic due to the absence of active control of the engine disconnect clutch.

The rotary electric machine is directly connected to the transmission input shaft. In the present disclosure, control over the transmission's shift progression, particularly during EV shifts, is tied to the present state of the engine and the TCC, with the controller configured to control shifts of the transmission and engine ON/OFF transitions according to the exemplary shift control logic disclosed herein. Likewise, the controller is configured to selectively override existing control algorithms to force the TCC into an open state under certain modes. This capability allows the controller to ensure that the TCC does not close before the engine disconnect clutch.

In an exemplary embodiment, the powertrain includes an internal combustion engine, a rotary electric machine, a torque converter, a one-way engine disconnect clutch, an automatic transmission, and a controller. The torque converter includes a pump, a turbine, and a torque converter clutch ("TCC"). The TCC, when applied, locks the pump to the turbine. The engine disconnect clutch is connected to the turbine. The transmission has an input shaft directly coupled to the electric machine, and selectively coupled to the engine via the engine disconnect clutch. An output shaft of the transmission is configured to connect to a set of road wheels of a vehicle.

The controller, in response to an engine-off request, determines a turbine speed and a pump speed of the turbine and pump, respectively, registers that the engine is in an engine-off state when the pump speed is less than the turbine speed, and executes an electric vehicle ("EV") mode shift of the transmission using machine torque from the electric machine when the pump speed is zero during the engine-off state.

A motor vehicle having the above-noted powertrain is also disclosed, along with a method for controlling the powertrain.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

Figure 1:
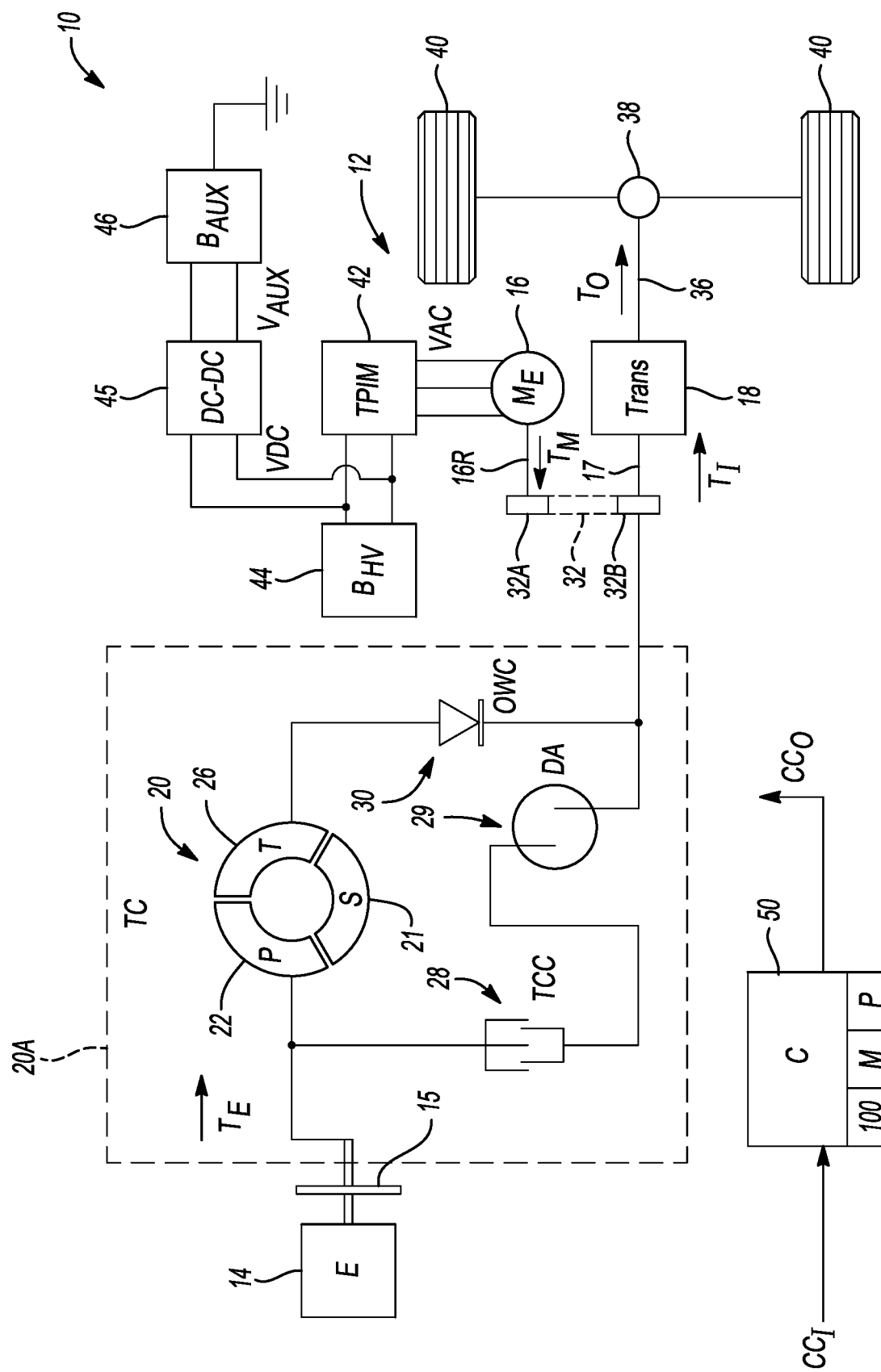
FIG. 1 is a schematic illustration of a representative hybrid electric powertrain controlled in accordance with aspects of the present disclosure.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like features throughout the several views, a motor vehicle 10 having a P2-type hybrid electric powertrain 12 is depicted schematically in FIG. 1. The powertrain 12 includes multiple torque sources for propelling the vehicle 10, which in the illustrated embodiment are an internal combustion engine ("E") 14 and a rotary electric machine ("$M_E$") 16. The engine 14 and the electric machine 16 are individually and cooperatively controlled via an onboard electronic control unit, hereinafter a hybrid controller ("C") 50 for simplicity, with the controller 50 operating via a disclosed method 100 and variations thereof.

The controller 50 is configured to execute the method 100 in the overall control of the P2 hybrid electric powertrain 10. To that end, the controller 50 is equipped with a processor ("Pr") and sufficient memory ("M"), i.e., tangible, non-transitory memory such as read only memory, which may be optical, magnetic, flash, etc. The controller 50 also includes application-sufficient amounts of random-access memory, electrically-erasable programmable read only memory, and the like, a high-speed clock, analog-to-digital and digital-to-analog circuitry, and input/output circuitry and devices, and appropriate signal conditioning and buffer circuitry. Control routines are executed in response to input signals (arrow $CC_I$) from various sensors and/or networked control modules.

The term "controller" as used herein refers to one or more Application Specific Integrated Circuit(s) ("ASIC"), Field-Programmable Gate Array ("FPGA"), electronic circuit(s), central processing unit(s), e.g., microprocessor(s) and associated non-transitory memory component(s) in the form of memory (M) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Communication between individual control modules, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The electric machine 16 is connected to an input shaft 17 of an automatic transmission ("TRANS") 18. Execution of instructions embodying the method 100 by the controller 50 enables the controller 50, among other processes, to determine precisely when to transition the powertrain 12 into or out of an electric vehicle ("EV") mode of operation in which input torque (arrow $T_I$) into the transmission 18 is provided solely by machine torque (arrow $T_M$) from the electric machine 14. The method 100 seeks to smoothly blend available engine torque (arrow $T_E$) with the machine torque (arrow $T_M$) to smooth operating mode transitions in which the engine 14 is either connected to or disconnected from the transmission 18, with the controller 50 determining the correct signals to consider during EV shifts when the engine 14 is not running but may still have a positive speed.

The powertrain 12 of FIG. 1 also includes a hydrokinetic torque converter ("TC") 20 having an impeller/pump ("P") 22, a stator ("S") 21, and a turbine ("T") 26. The pump 22 is connected to and driven by the engine 14, for instance via an intervening flex plate 15. When the engine 14 is fueled and connected to the input shaft 17 of the transmission 18 through the torque converter 20, the generated engine torque (arrow $T_E$) is transmitted from the rotating pump 22, across the stator 21, and to the turbine 26. As the turbine 26 is connected to the input shaft 17, engine torque (arrow $T_E$) is available as a contributor to the input torque (arrow $T_I$), alone or in conjunction with the machine torque (arrow $T_M$) depending on the operating mode.

An engine disconnect clutch 30 is embodied herein as a passive one-way clutch ("OWC"). As such, the engine disconnect clutch 30 is not a selectable or actively controllable device, and its state is thus determined by the controller 50 as part of the method 100 using other values as explained below. The engine disconnect clutch 30 in some configurations may be an integral component of the torque converter assembly 20, as indicated by box 20A. An example of such an integral torque converter configuration is disclosed in U.S. Pat. No. 10,288,159 to Li et al., which is hereby incorporated by reference in its entirety.

As will be appreciated, when the engine disconnect clutch 30 is integral with the torque converter assembly 20, the ON/OFF state of the engine disconnect clutch 30 is not directly discernable by the controller 50. Instead, the controller 50 assumes the state of the engine disconnect clutch 30 corresponds to the commanded on/off state of the engine 14. That is, when the engine 14 is running and producing engine torque (arrow $T_E$), the engine disconnect clutch 30 is treated in logic as being ON/applied, with a direct torque path existing between the turbine 26 and the input shaft 17 of the transmission 18. Likewise, the torque path between the turbine 26 and the input shaft 17 is broken when the engine disconnect clutch 30 is OFF/disengaged, e.g., as the engine 14 is idling or fuel feed is off and the TCC 28 noted below remains disengaged. In such a state, friction torque from the engine 14 is zero at the input shaft 17.

Also within the torque converter 20, the pump 22 may be selectively locked to the turbine 26 above a calibrated threshold rotational speed via operation of a torque converter clutch ("TCC") 28. A damper assembly ("DA") 29 may be disposed in series with the TCC 28 to effectively damp resultant noise, vibration, and harshness due to operation of the TCC 28. As part of the present method 100, and as explained below with reference to FIGS. 3 and 4, the controller 50 ensures that the TCC 28 does not engage before the engine disconnect clutch 30, with the controller 50 achieving such ends by selectively overriding control signals to the TCC 28, e.g., from a transmission control module or associate logic.

In the illustrated embodiment of FIG. 1, a rotor shaft 16R of the electric machine 16 is connected to the input shaft 17 via a set of pulleys 32A, 32B and a drive element 32, e.g., a closed loop of chain or belt, or a suitable constructed gear set. Output torque (arrow $T_O$) from the transmission 18 is thereafter delivered to an output shaft 36 of the transmission 18. The output shaft 36 may be connected to a driven load, such as a final drive unit 38 and a set of road wheels 40 in an exemplary motor vehicle application.

The electric machine 16 is embodied herein an electric motor/generator unit composed of an annular stator and rotor (not shown), with the rotor connected to the rotor shaft 16R to rotate in conjunction therewith. The rotor shaft 16R in turn is connected to one of the pulleys 32A, the rotation of which ultimately powers the transmission 18 in EV modes or EVT modes in which the electric machine 16 is used in conjunction with the engine 14. The electric machine 16 may be optionally embodied as a polyphase/alternating current ("AC") machine drawing power from a traction power inverter module ("TPIM") 42 and a high-voltage battery pack ("$B_{HV}$") 44, with "high-voltage" being an application specific value. Some embodiments, for instance, may be targeted to 48V, while others may be higher or lower.

In such an AC embodiment, an AC voltage ("VAC") powers phase windings of the electric machine 16 on an AC side of the TPIM 42, while a DC voltage ("VDC") is present on a DC side of the TPIM 42, i.e., a high-voltage bus. A DC-DC converter ("DC-DC") 45 may be connected to such a high-voltage bus as shown and configured to reduce the DC bus voltage, e.g., to 12-15V auxiliary levels ("$V_{AUX}$") for storage in an auxiliary battery ("$B_{AUX}$") 46, for instance a lead-acid battery.

As will be described in detail below with reference to the remaining Figures, execution of the method 100 by the controller 50 provides several performance advantages. For instance, the engine 14 may be selectively disconnected from the input shaft 17 of the transmission 18 to transition to an EV mode. This may occur during EV drive modes as well as braking/regeneration modes. As will be appreciated, regeneration events occur when the electric machine 16 is operated so as to recover energy when slowing the vehicle 10, with the electric machine 16 operated as a generator in such modes to store energy in the battery pack 44.

Due to the mass of the engine 14, the rotational speed of the engine 14, once disconnected from the input shaft 17, may range anywhere from just below current turbine speed down to zero. That is, once a fuel cut-off event is triggered in response to an auto-stop event of the engine 14, the engine 14 continues to rotate at a decreasing rate of speed. Likewise, a non-rotating engine 14 will begin to rotate slowly at the onset of cranking and firing before reconnecting to the transmission 18.

In light of the above speed variation in the P2 powertrain 12, the method 100 is intended to allow the controller 50 to determine when the engine 14 is truly ON or OFF, using speed differential information across the torque converter 20 in making such a determination. Such information is then used in shift control of the transmission 18, via control signals (arrow $CC_O$) from the controller 50, e.g., to determine appropriate line pressures and feed-forward pressures for use during mode shifts created by an auxiliary pump (not shown), as well as speed feedback control variables to use during the inertia phase of a given shift, i.e., after an offgoing clutch hands torque off to an oncoming clutch, as will be appreciated by those of ordinary skill in the art.

Figure 2:
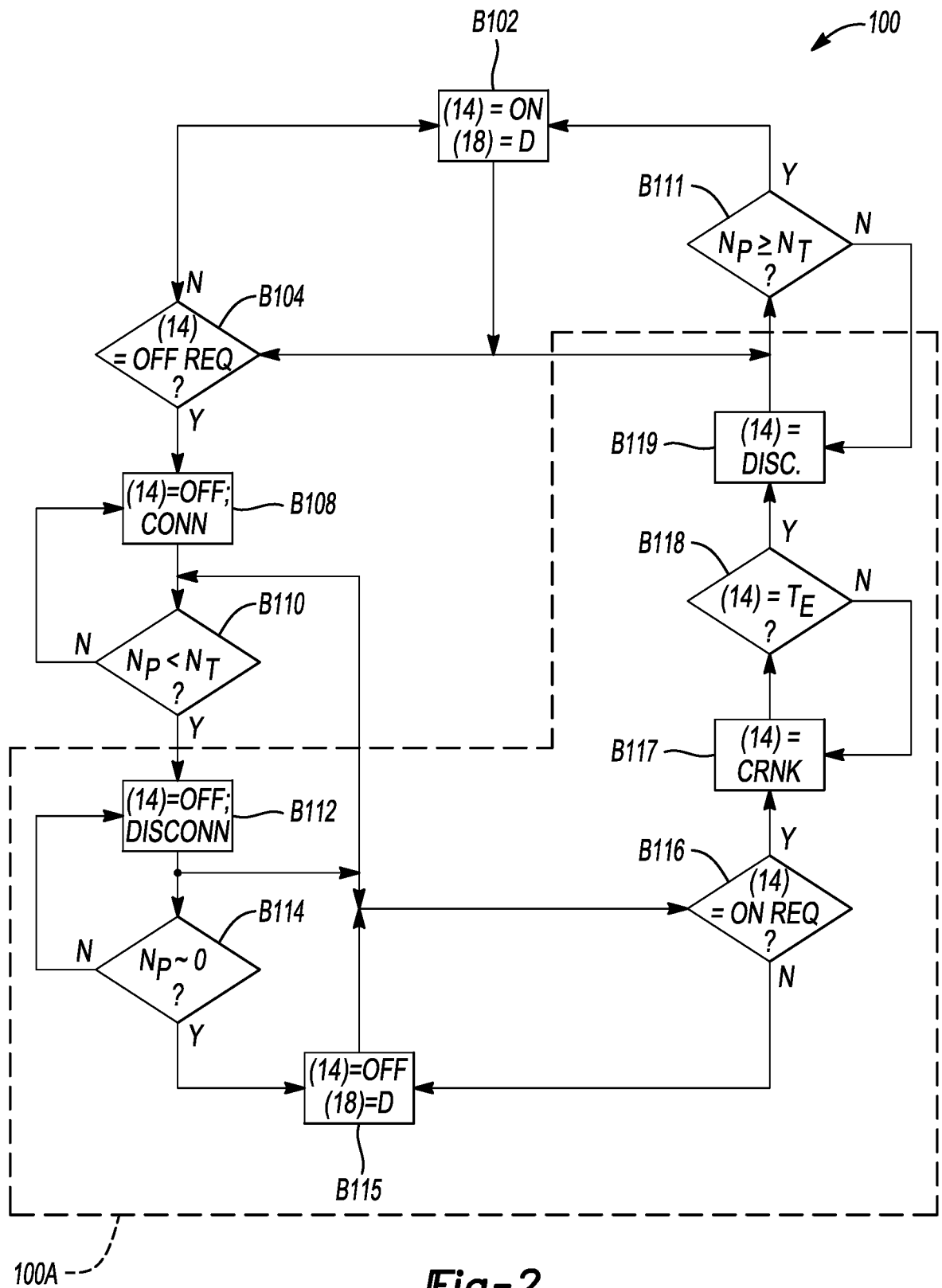
FIG. 2 is a flow chart describing a method of controlling the exemplary powertrain of FIG. 1.

Referring to FIG. 2, a general embodiment of the method 100 is depicted with reference to components of the powertrain 12 shown in FIG. 1. FIG. 2 is an exemplary application of the present teachings for regulating a transition from an ON/running state of the engine 14, during which the engine 14 is connected to the transmission 18 via engagement of the engine disconnect clutch 30, and an OFF state of the engine 14 in which the engine 14 is disconnected from the transmission 18 via disengagement of the engine disconnect clutch 30.

As described below, the present teachings seek to optimize the efficiency of EV and other mode transitions requiring the connection or disconnection of the engine 14 whenever the electric machine 16 is actively powering the input shaft 17 of the transmission 18 shown in FIG. 1. When the engine disconnect clutch 30 is integral with the torque converter assembly 20 as shown in block 20A of FIG. 1, it is not possible to independently verify the true ON/OFF state of the engine disconnect clutch 30. That is, the engine disconnect clutch 30 lacks a corresponding active ON/OFF control signal that can be monitored by the controller 50. The method 100 may be used in such an embodiment to determine whether the engine 14 is ON or OFF, and whether engine speed is decreasing subsequent to a commanded engine-off event.

Blocks B102-B111: Engine Running/Engaged

The method 100 commences at block B102 with the engine 14 in an ON/running state and the transmission 18 in a drive state, i.e., "(14)=ON, (18)=D". At the onset, the engine 14 is connected to the transmission 18, i.e., the engine disconnect clutch 30 is closed. Shifts of the transmission 18 are possible in block B102 using engine torque from the engine 14 and machine torque from the electric machine 16 in response to operation in the engine-on state. The controller 50 proceeds to blocks B104 and B111.

Block B104 includes determining, via the controller 50, whether an engine-off request is active, i.e., "(14)=OFF REQ?". For instance, the controller 50 may receive and process user-generated or autonomously generated signals indicating that machine torque (arrow $T_M$) alone will suffice, i.e., engine torque (arrow $T_E$) is not required. Block B104 may also be an autonomously-generated engine autostop request, such as when the vehicle 10 comes to a standstill at a stoplight. The controller 50 proceeds to block B108 when an engine-off request is received, and otherwise repeats block B102.

Block B108 includes commanding the engine 14 to shut off. Block B108 may entail transmitting control signals (arrow $CC_O$) to the engine 14 to cut off fueling of the cylinders thereof, with this control action abbreviated "(14) OFF; CONN" in FIG. 2 to indicate that the engine 14 remains connected to the input shaft 17. The method 100 proceeds to block B110 as the engine 14 shuts down and its rotational speed slowly decreases with the engine disconnect clutch 30 closed.

At block B110, the controller 50 of FIG. 1 receives, measures, or otherwise determines a rotational speed of the pump 22 and of the turbine 26, e.g., from speed sensors and/or via calculation from a state model. The controller 50 thereafter compares the rotational speed of the pump 22 to the rotational speed of the turbine 26 to determine whether the pump speed is less than the turbine speed, i.e., "$N_P<N_T$". The controller 50 repeats blocks B108 and B110 in a loop until the turbine speed drops below the pump speed. The controller 50 then proceeds to block B112.

At block B111, the controller 50 determines whether the rotational speed of the pump 22 equals or exceeds the rotational speed of the turbine 26, i.e., "$N_P \geq N_T$". The controller 50 registers that the engine 14 is in an engine-on state and connected and proceeds to block B102 when the pump speed equals or exceeds the turbine speed. The controller 50 repeats block B119 when the turbine speed still exceeds the pump speed, which is indicative of the engine 14 not having been fully started.

Blocks B112-B119: Engine Disconnected

Blocks B112-B119, which are collectively labeled as subroutine 100A, collectively describe operation of the transmission 18 of FIG. 1 when the engine 14 is disconnected, i.e., the engine disconnect clutch 30 is in an open/disengaged state. As described separately below, operation in subroutine 100A, which corresponds to EV modes, includes discontinuing active control of the TCC 28 of FIG. 1. That is, the TCC 28 is OFF and not fed with line pressure.

As will be explained separately below, the engine 14 continues to present friction torque as a negative torque or drag on the transmission 18. Such friction torque is accounted for during certain events, such as an engine auto-start when the vehicle 10 is accelerated from a prolonged standstill. EV control of the transmission 18 ultimately involves deriving suitable line pressure and feedforward pressure commands during shifts of the transmission 18, doing so using the machine torque (arrow $T_M$) on the input shaft 17.

When calculating turbine torque when the engine 14 is truly at zero speed, with turbine torque being the current torque on the turbine 26 depicted in FIG. 1, the pump speed associated with operation of the engine 14 when determining turbine torque is replaced with the rotational speed of the electric machine 16. That is, the controller 50 determines input torque to the transmission 18 without torque multiplication from the torque converter 20 and net engine torque is zero. Machine speed is also used to determine speed feedback control terms during the inertia phase of shifts of the transmission 18. As part of the method 100, the controller 50 may be programmed with a shift map detailing the required line pressures, and feed-forward, and feedback terms based on machine torque and speed for use both during EV operation and also when connecting or disconnecting the engine 14 to/from the transmission 18.

At block B112, the controller 50 registers that the engine 14 is in an engine-off state, e.g., by recording such a state in memory M, and that the engine 14 has been disconnected from the transmission 18 via passive operation of the engine disconnect clutch 30. The method 100 proceeds to block B114 while repeating bock B110, with repetition of block B110 ensuring that pump speed remains below turbine speed, e.g., that a change-of-mind shift has not commenced. The method 100 also proceeds to block B116.

Block B114 includes determining whether the pump speed is zero or within a calibrated range thereof ("$N_P \sim 0$"), with zero/near-zero speed of the pump 22 indicating that the engine 14 has reached a complete stop. The controller 50 repeats blocks B112 and B114 in a loop until pump speed reaches zero, whereupon the method 100 proceeds to block B115.

At block B115, the controller 50 operates the transmission 18 in a drive mode with the engine 14 off/not running, i.e., an EV mode ("(14)=OFF; (18)=D"). Control of the transmission 18 proceeds according to programmed logic, possibly including executing an electric vehicle ("EV") mode shift of the transmission 18 using machine torque (arrow $T_M$) from the electric machine 16, with the controller 50 considering the speed and torque from the electric machine 16 as the sole inputs to the transmission 18 during such EV mode shifts, including when entering the EV mode. The method 100 then proceed to block B116.

At block B116, the controller 50 detects an engine-on request ("(14) ON REQ?"). For instance, the controller 50 may determine, based on a torque request, that the engine 14 needs to be fueled and fired in order to meet the request. Such a request may be made by an operator of the vehicle 10, or the request may be autonomously generated by the controller 50. The method 100 proceeds to block B117 in response to an engine-on request, and repeats block B115 absent the engine-on request.

Block B117 includes commanding cranking of the engine 14 ("(14)=CRNK" via the controller 50, for instance by transmitting control signals (arrow $CC_O$) that commence rotation of engine 14 via a starter motor (not shown) to a threshold speed sufficient for fueling and firing the engine 14. When operating in EV mode and driver demand requires that the engine 14 be started, the present architecture also enables a TCC bump-start to be performed. For instance, when driving at low speeds, e.g., 10 MPH, and in lieu of using a starter motor, the controller 50 may control pressure to the TCC 28 to slip the TCC 28 and thereby help increase engine speed to a starting threshold, such as 200-300 RPM before the engine starts refueling. The speed of the engine 14 thereafter increases as the method 100 proceeds to block B118.

Block B118 entails determining whether the engine 14 has commenced producing engine torque ("(14)=$T_E$") and/or has reached a sufficient threshold speed for doing so. If so, the method 100 proceeds to block B119, with the controller 50 repeating block B117 until positive engine torque is produced.

At block B119, the controller 50 verifies that the engine 14 has started, with the engine 14 at this point still considered in logic to be disconnected from the transmission 18. The method 100 then proceeds to block B111.

For smoothing torque transitions in the exemplary powertrain 12 of FIG. 1 when turning on the engine 14 during an autostart event, e.g., at blocks B117 and B118, it is important to stagger the operations of turning on the engine 14, shifting the transmission 18, and engaging the TCC 28 such that none of these events occurs simultaneously. Thus, when an engine-on request is active, the controller 50 should evaluate whether a shift event of the transmission 18 is already in progress. If the shift event is already in progress, the controller 50 waits for the shift event to finish before turning on the engine 14.

Likewise, if the engine-on event has already commenced when a shift request of the transmission 18 is received, the controller 50 waits for completion of the engine-on event before completing the shift request. Engagement or disengagement of the TCC 28 is also delayed when an engine-on or transmission shift event are active. Staggering the engine restart, transmission shift, and control of the TCC 28 is beneficial to reducing noise, vibration, and harshness that may be perceptible to a driver or ride smoothness. The controller 50 is therefore configured as part of the method 100 to determine the time of onset of such events, and to allow the earliest-initiated event to complete before commencing the next event.

Figures 3, 4:
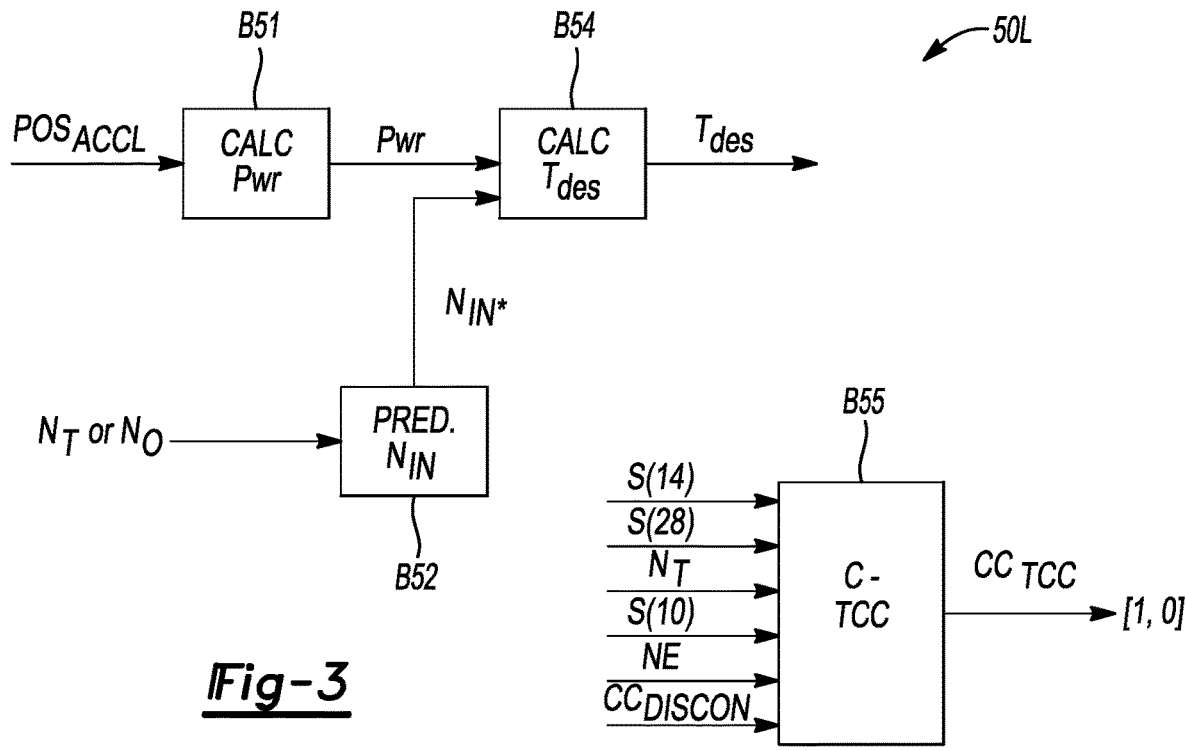
FIG. 3 is a schematic illustration of exemplary control logic usable as part of the present method.
FIG. 4 is a table describing various modes of operation and control states for the exemplary powertrain of FIG. 1.

Referring to FIGS. 3 and 4, operation of the powertrain 12 of FIG. 1 according to method 100 may be further optimized using control logic 50L. The control logic 50L of FIG. 3 implements a driver torque model to derive a desired input torque to the transmission 18. This occurs based on a requested power and predicted input speed to the transmission 18, with the latter value based on present hybrid modes and commands to the TCC 28 shown in FIG. 1. Additionally, the control logic 50L enables the controller 50 to consider when to communicate zero engine friction torque to hybrid controls enacted by the controller 50 when executing EV shifts of the transmission 18 and connecting or disconnecting the engine 14.

As will be appreciated by one skilled in the art, an engine 14 is fluidly coupled to the transmission 18 across the torque converter 20, and thus acts on the transmission with a minimum engine torque. Thus, the engine minimum torque is used by the controller 50 when determining the total input torque to the transmission 18. As the engine 14 has mass, the engine 14 has a calibrated engine friction torque, i.e., a calibrated negative torque value stored in memory of the controller 50. Ordinarily, control logic of a typical hybrid controller sets the engine minimum torque to the calibrated engine friction torque when the engine 14 is in a fuel cut-off state. For the present P2 powertrain 12, however, the controller 50 is configured to selectively set the engine minimum torque to zero based on vehicle and engine states, as detailed in FIG. 4.

Referring first to FIG. 3 and the above-noted driver torque model, at block B51 the controller 50 determines a desired power level ("CALC Pwr") from a human or autonomous operator of the powertrain 12. For instance, the controller 50 may detect an accelerator pedal position (arrow $POS_{ACCL}$), and possibly other input values such as brake pedal position (not shown), collectively indicating a relative apply position(s) of pedal or other control device(s) operable for inputting a driver torque command. Block B51 converts the operator request to a desired power level e.g., using a pedal position-to-power look up table or an equation. The desired power level (arrow Pwr) is then used as an input value at block B54.

Block B52 is used by the controller 50 to derive a predicted input speed (arrow $N_{IN}^*$) to the transmission 18 of FIG. 1, and to transmit the predicted input speed as another input to block B54. The predicted input speed (arrow $N_{IN}^*$) is based on the present hybrid mode or ON/OFF command to the TCC 28, with block B54 receiving the current turbine speed ($N_T$) or the current output speed ($N_O$) of the transmission 18 as inputs in different embodiments.

The controller 50 may use a variety of factors to derive the predicted input speed ($N_{IN}^*$) noted above. For instance, the controller 50 may execute the following algorithm:

```
IF TC (20) Open
   :(N_T)(TC Model)
ELSE IF TCC (28) On
   :N_T + TCC Target Speed
ELSE IF TCC Lock
   :N_T
ELSE Transition
   :(N_T)(Model Transition)
``` where the torque converter model ("TC Model") is a calibrated ratio, "TCC Target Speed" is a calibrated slip speed across the TCC 28, e.g., 20 RPM, and "Model Transition" is a calibrated speed value, e.g., 300-400 RPM.

At block B54, the control logic 50L next calculates a desired input torque (arrow $T_{des}$) to the transmission 18, which is calculated using the desired power (arrow Pwr) from block B51 and the predicted input speed ($T_{des}$) from block B52, i.e., $Pwr/N_{IN}^*$. That is, the controller 50 is informed of the amount of power the driver or the controller 50 requires in response to the inputs to block B51 and the predicted input speed ($N_{IN}^*$) from block B52. From this information, the controller 50 selects or calculates the amount of input torque (arrow $T_{des}$) that would be optimal in terms of an optimally smooth restart of the engine 14.

Also depicted in FIG. 3 is a TCC logic block B55 ("C-TCC"). Block B55 enables the controller 50 to ensure that the TCC 28 of FIG. 1 is in an open/disengaged state under three specific conditions: (1) when driving the vehicle 10 of FIG. 1 in an EV mode, (2) when the engine 14 is running with an engine speed that is below the turbine speed, and (3) when the engine 14 is to be disconnected during a regenerating mode. The TCC logic block B55 effectively overrides existing transmission control logic of the controller 50 to force the TCC 28 into an open state under such conditions.

Inputs to block B55 may include the current engine on/off state ("S(14)"), current TCC engagement state ("S(28)"), current turbine speed ("$N_T$"), current vehicle state or mode ("S(10)"), current engine speed ("$N_E$"), and the present state of an engine disconnect request ("$CC_{DISCON}$"), e.g., from the controller 50 or another hybrid operating system. Using a lookup table or weighted calculation, the controller 50 uses block B55 to output a TCC override signal as a binary 1 or 0 value. When a TCC override signal of 1 is generated, the TCC 28 opens regardless of the possible presence of a contradictory request from other control logic. When a TCC override signal of 0 is generated, the TCC 28 is allowed to follow its ordinary logic, and thus may be open or closed.

As mentioned above, as part of the method 100 the controller 50 is able to selectively communicate zero engine friction torque to the rest of the hybrid powertrain controls. In a BAS hybrid, for instance, engine minimum torque is usually set equal to the engine friction torque whenever the engine of such a powertrain is off. In the P2 powertrain 12 depicted in FIG. 1, the engine-off minimum torque is set to zero under certain conditions. Thus, the controller 50 described herein is configured to selectively switch engine torque to zero in logic based on the present states of the engine 14 and the vehicle 10.

In a particular embodiment, the controller 50 is configured to pass zero or non-zero friction torque values to hybrid control logic of the controller 50 under the following conditions:

| Engine Speed | Engine State | Vehicle State | TCC State | Engine Friction |
|---|---|---|---|---|
| + | OFF | Braking/regen | OPEN | 0 |
| + | OFF | Braking/regen | LOCKED | Friction torque |
| 0 | OFF | EV | OPEN | 0 |
| 0 | OFF/start of cranking | EV/engine ON | OPEN | Friction torque |
| + | OFF/cranking | EV/engine ON | OPEN | Friction torque |
| 0 | OFF | Stop | OPEN | 0 | where "+" indicates a positive non-zero engine speed and "0" indicates that the engine 14 is not rotating. At the start of cranking, for instance, a starter pinion is engaged and the engine 14 is about to be spun up, but remains at zero speed. The controller 50 is thus made aware that static engine friction torque is present. When the engine 14 starts to spin, it will do so with dynamic engine friction torque, with zero being the absolute engine speed, i.e., "+" is greater than 0.

As indicated in the above table of engine-off states, the controller 50 assumes a calibrated friction torque (a negative value corresponding to the particular configuration of the engine 14) in quantifying input torque to the transmission 18 when the TCC 28 is locked, as well as during cranking and starting of the engine 14. The controller 50 assumes zero engine friction torque under the other listed conditions when the TCC 28 is open during braking or other regeneration events, when operating in EV mode, and when the vehicle 10 is at a standstill.

Referring to FIG. 4, a table 60 is depicted for establishing various states of the vehicle 10 of FIG. 1. Such states, abbreviated S(10), include EV mode, an engine start mode at throttle tip-in ("(14) TIP"), hybrid operation of the powertrain 12 with the TCC 28 open ("HEV, 28=O") with slip across the torque converter 20, or locked ("HEV, 28=L") such that the pump 22 and turbine 26 rotate at the same speed, and a transition to engine-off ("→(14) OFF"). Additionally, the vehicle states include engine-off regeneration ("(14)=OFF/REG"), a change-of-mind shift when engine speed is less than turbine speed ("Δ1"), a change-of-mind shift when engine speed exceeds turbine speed ("Δ2"), and a state at which the vehicle 10 is stationary ("(10)=0 RPM").

Each of the indicated vehicle states has a corresponding engine state ("S(14)"), current TCC state ("S(28)*"), engine speed ("$N_E$"), engine disconnect command ("DISC") from the controller 50 (1 or 0), a reset output command ("R"), which is also a 0 or 1 binary signal, and the above-described override signal for the TCC 28, i.e., ("S(28)"). For example, in an EV mode the engine is OFF, the TCC 28 is OPEN, and engine speed is 0 RPM. Relative to FIG. 3, therefore, the TCC 28 is commanded to open at least in EV, engine start at tip-in, a fuel cut-off transition to engine OFF, an engine OFF regen event, the change-of-mind shift when engine speed is less than turbine speed, and when the vehicle 10 is stationary.

During certain stages of control as set forth above, the controller 50 may use torque feedback control when regulating engine torque/throttle. As will be appreciated, such an approach attempts to keep a modeled torque and a desired torque as close together as possible. Modeled torque may be based on air/spark/fuel, with initial torque numbers typically noisy and less accurate. Thus, the controller 50 may use proportional-integral-derivative (PID) control during engine restart, or when disconnecting the turbine or pump. If PID is turned on too early, however, an overcorrection may result, which may be perceived as a torque surge. To address this potential problem, the controller 50 may implement feedback gain scheduling via the PID to slowly transition from zero gain to full gain as PID feedback is turned on. The transition can be conditioned as the modeled torque stabilizes in an embodiment, or the transition can be time-based.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; modifications, changes, and variations apparent from the foregoing descriptions are within the scope of the disclosure as defined by the appended claims. Moreover, the present concepts expressly include combinations and subcombinations of the preceding elements and features.

What is claimed:

1. A hybrid electric powertrain for a motor vehicle, comprising:
   an internal combustion engine;
   a rotary electric machine;
   a torque converter having a pump, a turbine, and a torque converter clutch ("TCC") configured, when applied, to lock the pump to the turbine;
   a one-way engine disconnect clutch connected to the turbine;
   an automatic transmission having an input shaft, wherein the input shaft is directly coupled to the electric machine, and is selectively coupled to the engine via the engine disconnect clutch, and an output shaft configured to connect to a set of road wheels of the vehicle; and
   a controller configured, in response to an engine-off request, to determine a turbine speed and a pump speed of the turbine and the pump, respectively, to register that the engine is in an engine-off state when the pump speed is less than the turbine speed, and to execute an electric vehicle ("EV") mode shift of the transmission using machine torque from the electric machine when the pump speed is zero during the engine-off state.

2. The powertrain of claim 1, wherein the controller, in response to receipt of an engine-on request during the engine-off state, is configured to request cranking of the engine, and once the engine begins producing positive torque, to register that the engine is in an engine-on state only when the pump speed equals or exceeds the turbine speed, and to thereafter execute an additional shift of the transmission using engine torque from the engine and machine torque from the electric machine in response to the engine-on state.

3. The powertrain of claim 2, wherein the controller includes a driver torque model configured to calculate a desired input torque to the transmission based on a desired power level and a predicted input speed to the transmission, and to control the EV mode shift and the additional shift using the desired torque.

4. The powertrain of claim 3, wherein the driver torque model receives a pedal position signal indicative of a requested acceleration of the motor vehicle, and is configured to calculate the desired power level using the requested acceleration.

5. The powertrain of claim 3, wherein the controller is configured to determine the predicted input speed as a function of the turbine speed by multiplying the turbine speed by a calibrated ratio when the torque converter is in an open state, adding a target speed to the turbine speed when the TCC is slipping, and using the turbine speed alone when the TCC is locked.

6. The powertrain of claim 1, wherein the controller is configured to selectively force the TCC into an open state when the vehicle is operating in an EV mode, when the engine is running with engine speed below the turbine speed, and when the engine is disconnected during a regenerating mode, such that the TCC does not close prior to closing the engine disconnect clutch.

7. The powertrain of claim 1, wherein the controller is programmed with a calibrated engine friction torque as a predetermined negative torque value provided by the engine in the engine-off state, and is configured to selectively set the engine friction torque value to zero when the TCC is slipping in the engine-off state.

8. The powertrain of claim 1, wherein the engine disconnect clutch is an integral component of the torque converter.

9. A motor vehicle comprising:
a set of road wheels; and
a hybrid electric powertrain comprising:
an internal combustion engine;
a rotary electric machine;
a torque converter having a pump, a turbine, and a torque converter clutch ("TCC") configured, when applied, to lock the pump to the turbine;
a one-way engine disconnect clutch connected to the turbine;
an automatic transmission having an input shaft, wherein the input shaft is directly coupled to the electric machine, and is selectively coupled to the engine via the engine disconnect clutch, and an output shaft connected to the set of road wheels; and
a controller configured, in response to an engine-off request, to determine a turbine speed and a pump speed of the turbine and the pump, respectively, to register that the engine is in an engine-off state when the pump speed is less than the turbine speed, and to execute an electric vehicle ("EV") mode shift of the transmission using machine torque from the electric machine when the pump speed is zero during the engine-off state; and
in response to receipt of an engine-on request during the engine-off state, the controller is configured to request cranking of the engine, and once the engine begins producing positive torque, to register that the engine is in an engine-on state only when the pump speed equals or exceeds the turbine speed, and to thereafter execute an additional shift of the transmission using engine torque from the engine and machine torque from the electric machine in response to the engine-on state.

10. The vehicle of claim 9, wherein the controller includes a driver torque model configured to calculate a desired input torque to the transmission based on a desired power level and a predicted input speed to the transmission, and to control the EV mode shift and the additional shift using the desired torque, and wherein the driver torque model receives a pedal position signal indicative of a requested acceleration of the motor vehicle, and is configured to calculate the desired power level using the requested acceleration.

11. The vehicle of claim 10, wherein the controller is configured to determine the predicted input speed as a function of the turbine speed by multiplying the turbine speed by a calibrated ratio when the torque converter is in an open state, adding a target speed to the turbine speed when the TCC is slipping, and using the turbine speed alone when the TCC is locked.

12. The vehicle of claim 9, wherein the controller is configured to selectively force the TCC into an open state when the vehicle is operating in an EV mode, when the engine is running with engine speed below the turbine speed, and when the engine is disconnected during a regenerating mode, such that the TCC does not close prior to closing the engine disconnect clutch.

13. The vehicle of claim 9, wherein the controller is programmed with a calibrated engine friction torque as a predetermined negative torque value provided by the engine in the engine-off state, and is configured to selectively set the engine friction torque value to zero when the TCC is slipping in the engine-off state.

14. The vehicle of claim 9, wherein the engine disconnect clutch is an integral component of the torque converter.

15. A method for controlling a hybrid electric powertrain aboard a motor vehicle, the method comprising:
receiving an engine-off request via a controller of the powertrain;
determining a turbine speed and a pump speed of a respective turbine and pump of a torque converter of the powertrain, wherein the pump is connected to an internal combustion engine and the turbine is connected to an input shaft of a transmission via a one-way engine disconnect clutch;
registering that the engine is in an engine-off state when the pump speed is less than the turbine speed; and
executing an electric vehicle ("EV") mode shift of the transmission, via the controller, using machine torque from the electric machine when the pump speed is zero during the engine-off state.

16. The method of claim 15, further comprising:
receiving an engine-on request during the engine-off state via the controller;
requesting cranking of the engine in response to the engine-on request;
registering, once the engine begins producing positive torque, that the engine is in an engine-on state only when the pump speed equals or exceeds the turbine speed; and
executing an additional shift of the transmission via the controller using engine torque from the engine and machine torque from the electric machine in response to the engine-on state.

17. The method of claim 15, further comprising using a driver torque model to calculate a desired input torque to the transmission, via the controller, based on a desired power level and a predicted input speed to the transmission; and
controlling the EV mode shift and the additional shift using the desired torque.

18. The method of claim 17, further comprising receiving a pedal position signal indicative of a requested acceleration of the motor vehicle; and
calculating the desired power level using the requested acceleration.

19. The method of claim 17, further comprising determining the predicted input speed as a function of the turbine speed, via the controller, by multiplying the turbine speed by a calibrated ratio when the torque converter is in an open state, adding a target speed to the turbine speed when the TCC is slipping, and using the turbine speed alone when the TCC is locked.

20. The method of claim 15, further comprising selectively forcing the TCC into an open state when the vehicle is operating in an EV mode, when the engine is running with engine speed below the turbine speed, and when the engine is disconnected during a regenerating mode, such that the TCC does not close prior to closing the engine disconnect clutch; and
selectively setting an engine friction torque value to zero when the TCC is slipping in the engine-off state, wherein the engine friction torque is a predetermined negative torque value provided by the engine in the engine-off state.

* * * * *